Figure 1:
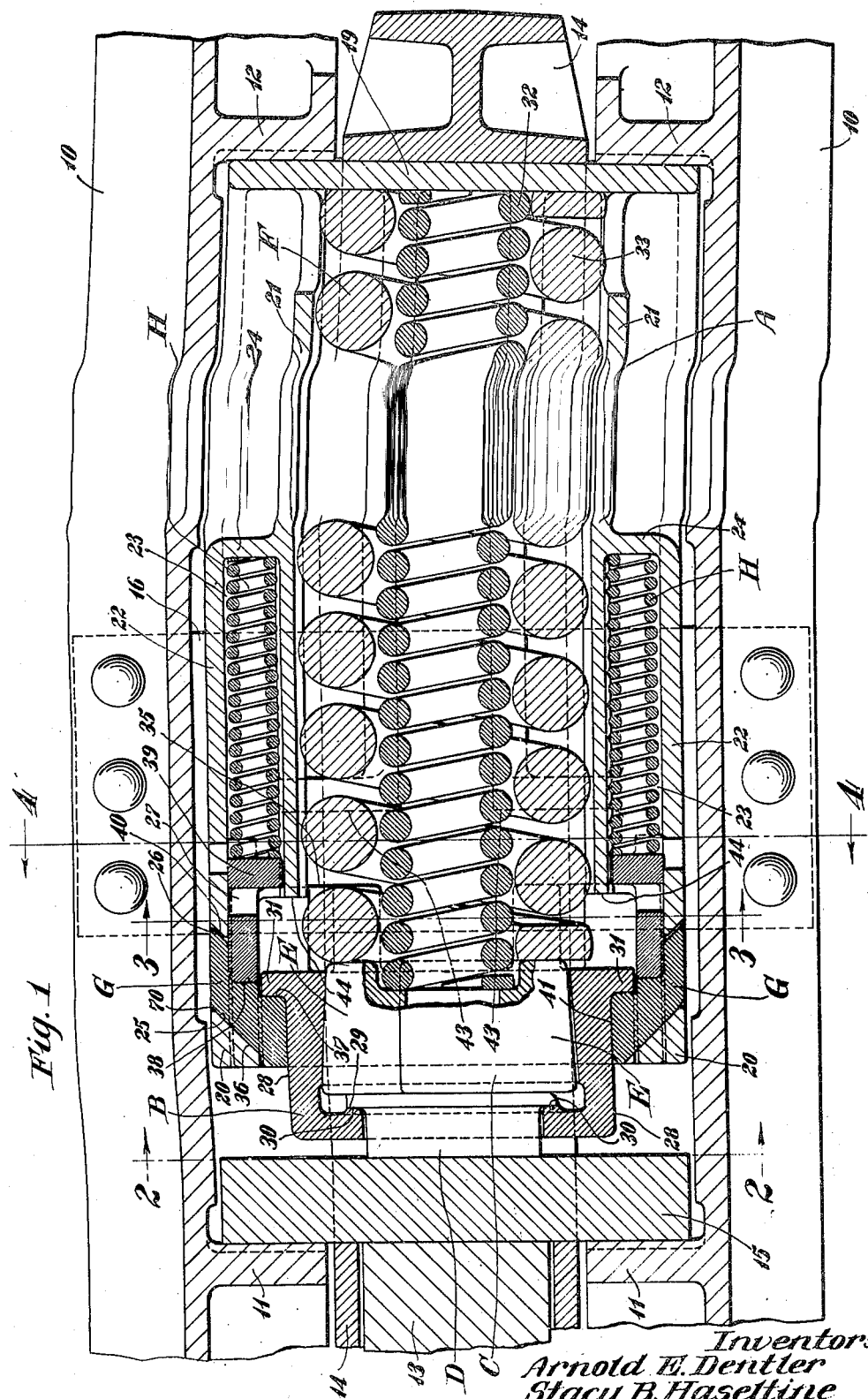

Feb. 15, 1944.   A. E. DENTLER ET AL   2,341,699
FRICTION SHOCK ABSORBING MECHANISM
Filed Aug. 23, 1941   3 Sheets-Sheet 1

Inventors
Arnold E. Dentler
Stacy B. Hasettine
By Henry Fuchs

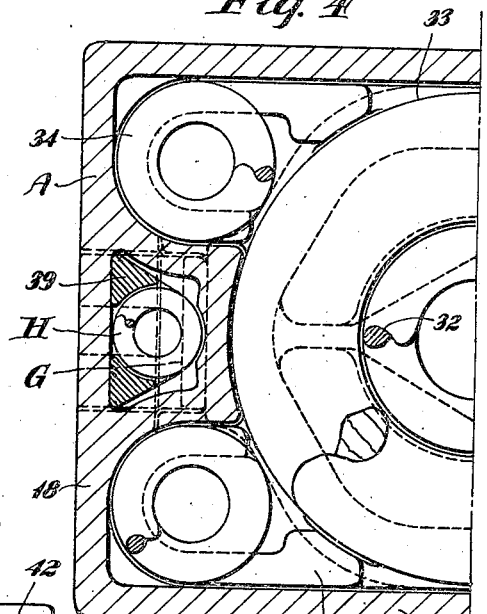
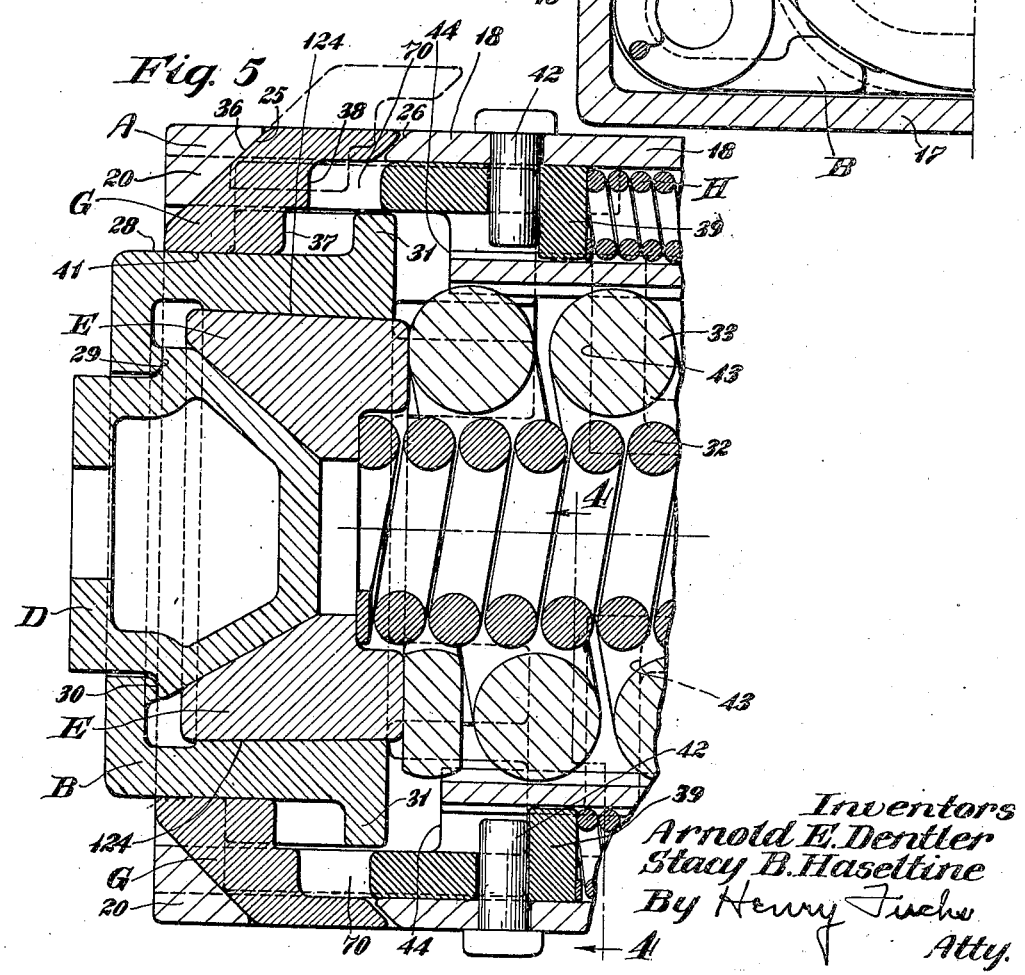

Patented Feb. 15, 1944

2,341,699

UNITED STATES PATENT OFFICE 2,341,699

FRICTION SHOCK ABSORBING MECHANISM

Arnold E. Dentler, Hinsdale, and Stacy B. Haseltine, La Grange, Ill., assignors to W. H. Miner, Inc., Chicago, Ill., a corporation of Delaware Application August 23, 1941, Serial No. 408,004

11 Claims. (Cl. 213—24)

This invention relates to improvements in friction shock absorbing mechanisms especially adapted for railway draft riggings.

One object of the invention is to provide a friction shock absorbing mechanism having preliminary spring action to cushion the lighter buffing and draft shocks of a railway draft rigging, and higher frictional resistance to take care of the heavier shocks wherein the frictional resistance is produced by a friction clutch slidable within a friction shell, and the preliminary light action is produced by movement of the shell and the clutch in unison against the resistance of a spring contained in a spring cage or casing.

A further object of the invention is to provide in a mechanism of the character set forth in the preceding paragraph simple and effective means for anchoring the friction shell to the spring cage.

Another object of the invention is to provide in a friction shock absorbing mechanism, comprising a spring cage, a friction shell movable lengthwise with respect to the spring cage, a friction clutch cooperating with the shell and spring means opposing inward movement of the shell with respect to the casing, means having frictional engagement with the shell during movement of the latter outwardly of the casing to retard the recoil of the spring in returning the friction shell to normal position, thereby assuring smooth operation during the spring action of the mechanism.

Other objects of the invention will more clearly appear from the description and claims hereinafter following.

In the drawings forming a part of this specification Figure 1 is a horizontal, longitudinal, sectional view through the underframe structure of a railway car, illustrating our improvements in connection therewith, the friction clutch being shown in plan. Figure 2 is a front elevational view, on an enlarged scale, of the friction shock absorbing mechanism only, shown in Figure 1, corresponding to the line 2—2 of Figure 1. Figure 3 is a transverse, vertical, sectional view on the line 3—3 of Figure 1, shown on an enlarged scale. Figure 4 is a transverse, vertical, sectional view, on an enlarged scale, corresponding to the line 4—4 of Figure 1, showing the structure at one side of the longitudinal center of the friction shock absorbing mechanism. Figure 5 is a view similar to Figure 1, on an enlarged scale, of the front end portion of the friction shock absorbing mechanism only, showing the manner of applying the anchoring element for the friction shell.

In said drawings 10—10 indicates channel shaped center or draft sills of the underframe structure of a railway car, on the inner sides of which are front and rear stop lugs 11—11 and 12—12. The inner end of the usual coupler shank is indicated by 13, and a hooded yoke 14 of well known form is operatively connected to said shank. The improved friction shock absorbing mechanism and a front main follower 15 are disposed within the yoke and the yoke is supported by a saddle plate 16 secured to the bottom flanges of the sills 10—10.

Our improved friction shock absorbing mechanism proper, comprises broadly a spring cage or casing A; a friction shell B; a friction clutch C including a wedge D and friction shoes E—E—E; a main spring resistance F; a pair of locking elements G—G which also serve as friction blocks; and auxiliary springs H—H.

The spring cage or casing A is in the form of a box-like member of substantially rectangular transverse cross section, having horizontally disposed, spaced top and bottom walls 17—17, vertically disposed, spaced side walls 18—18, and a transverse, vertically disposed, rear end wall 19. The end wall 19 cooperates with the stop lugs 12—12 in the manner of the usual rear follower. The front end of the casing A is open and the side walls 18—18, midway between the top and bottom of the casing, are thickened at said open front end as indicated at 20—20. Rearwardly of said thickened sections the side walls are offset inwardly as indicated at 21—21 at a zone midway between the top and bottom of the casing, said inset wall portions being in alignment with the thickened portions 20—20. Immediately to the rear of the thickened portions 20—20 the inset portions 21—21 are closed by outer wall members 22—22, thus providing spring pockets 23—23. Each spring pocket 23 is closed at its rear end by a transverse wall 24. Forwardly of the pocket 23 the thickened portion 20 of each side wall 18 is provided with an opening 70, having a laterally inwardly and forwardly inclined front wall 25 and a correspondingly inclined rear wall 26. Rearwardly of the wall 26 the thickened portion of the side wall is cut away on the inner side to provide a guideway 27, for a purpose hereinafter described, communicating with the spring pocket 23.

The friction shell B is in the form of a tubular member, of hexagonal transverse interior cross section, open at the front and rear ends. The six side walls of the shell present six interior flat friction surfaces 124, with which the shoes of shouldered engagement of the blocks G—G therewith, and outward movement of the clutch is limited by the wedge shouldering against the stop flange 29 of the shell B.

We have herein shown and described what we now consider the preferred manner of carrying out our invention, but the same is merely illustrative and we contemplate all changes and modifications that come within the scope of the claims appended hereto.

We claim:

1. In a friction shock absorbing mechanism, the combination with a spring cage having side walls, one of said walls having an opening therethrough, said opening having front and rear walls; of a friction shell telescoped within the cage, said shell having a laterally outwardly projecting stop lug thereon; a shoulder on the cage with which the shell is engageable to limit inward movement of the latter; friction means cooperating with the shell and adapted for movement lengthwise with respect to the shell; means yieldingly resisting movement of the shell inwardly of the cage and relative movement of the friction means and shell; and an anchoring block within the opening of the side wall of the cage, said block engaging the front wall of said opening, said block extending into the path of movement of the lug of the shell to limit outward movement of the shell, said block having a side face engaging the outer side of the shell.

2. In a friction shock absorbing mechanism, the combination with a spring cage having a side wall provided with an opening therethrough, said opening having a laterally inwardly inclined front wall; of a friction shell telescoped within the cage; a laterally projecting fixed stop lug on the shell; an anchoring block seated in said opening of the side wall of the cage, said block having a front end face engaged with said front wall of said opening and correspondingly inclined thereto, said block extending into the path of movement of said lug and having a flat side face engaging the side of the shell; spring means pressing said block against the inclined wall of said opening; a shoulder on the cage with which said shell is engageable to limit inward movement of the latter; friction means cooperating with the shell and adapted for movement lengthwise with respect to the shell; and means for yieldingly resisting movement of the shell inwardly of the cage and relative movement of the friction means and shell.

3. In a friction shock absorbing mechanism, the combination with a spring cage; of a friction shell telescoped within the cage, said shell and cage having relative movement in lengthwise direction; stop means on the cage limiting inward movement of the shell; friction means within the shell slidable lengthwise therein; springs within the cage yieldingly resisting inward movement of the shell and friction means; and means cooperating with the shell retarding outward movement of the same to snub the recoil action of the springs.

4. In a friction shock absorbing mechanism, the combination with a spring cage; of a friction shell telescoped within the cage, said shell and cage having relative movement in lengthwise direction; stop means on the cage limiting inward movement of the shell; friction means within the shell slidable lengthwise therein; springs within the cage yieldingly resisting inward movement of the shell and friction means; and a friction element having frictional engagement with the shell during outward movement thereof to snub the recoil of the springs.

5. In a friction shock absorbing mechanism, the combination with a spring cage; of a friction shell telescoped within the cage, said shell and cage having relative movement in lengthwise direction; stop means on the cage limiting inward movement of the shell; friction means within the shell slidable lengthwise therein; main springs within the spring cage yieldingly resisting inward movement of the shell and friction means; and a spring pressed friction element bearing on the shell, thereby retarding movement thereof to snub recoil action of the main springs.

6. In a friction shock absorbing mechanism, the combination with a spring cage; of a friction shell telescoped within the cage, said shell having a longitudinally extending exterior friction surface, said shell and cage having relative movement in lengthwise direction; stop means on the cage limiting inward movement of the shell; friction means within the shell slidable lengthwise therein; main spring means within the spring cage yieldingly resisting inward movement of the shell and friction means; and a spring pressed friction block having wedging engagement with the cage and frictional contact with the exterior friction surface of the shell to frictionally resist outward movement of the shell.

7. In a friction shock absorbing mechanism, the combination with a spring cage having a wedge face thereon; of a friction shell telescoped within the cage, said shell having a longitudinally extending exterior friction surface, said shell and cage having relative movement in lengthwise direction; stop means on the cage limiting inward movement of the shell; friction means within the shell slidable lengthwise therein; main spring means within the spring cage yieldingly resisting inward movement of the shell and friction means; a combined friction wedge block and anchoring member having wedging engagement with the wedge face of the cage; spring means forcing said member against said wedge face to press said block against the exterior friction surface of the shell to retard outward movement of the shell; and a laterally outwardly projecting stop lug on the shell engageable with the combined block and anchoring member to limit outward movement of the shell.

8. In a friction shock absorbing mechanism, the combination with a spring cage having a side wall provided with an opening therethrough, said opening having a front wall provided with a forwardly and inwardly inclined wedge face; of a friction shell telescoped within the cage, said shell having a longitudinally extending exterior friction surface, said shell and cage having relative movement in lengthwise direction; stop means on the cage limiting inward movement of the shell; friction means within the shell slidable lengthwise therein; main spring means within the spring cage yieldingly resisting inward movement of the shell and friction means; a friction block having a longitudinally disposed friction surface in engagement with the exterior friction surface of the shell, said block having a wedge face at its forward end engaging the wedge face of the spring cage; and spring means reacting between the spring cage and said block and forcing said block against said wedge face of the cage to wedge the block against the exterior friction surface of the shell.

9. In a friction shock absorbing mechanism, the combination with a spring cage having a side wall provided with an opening therethrough, said opening having a front end wall provided with a forwardly and inwardly inclined wedge face, said cage having a spring pocket in said side wall, rearwardly of said opening and communicating therewith; of a spring within said pocket; a friction wedge block in said opening pressed forwardly by said spring; a wedge face at the front end of said block engaged with the wedge face of the cage, said block having a longitudinally extending friction surface on the inner side thereof; a friction shell telescoped within the cage, said shell having a longitudinally extending exterior friction surface cooperating with the friction surface of said block, said shell being movable in lengthwise direction with respect to said cage; stop means on the cage limiting inward movement of the shell; friction means within the shell slidable lengthwise therein; and main spring means within the cage yieldingly resisting inward movement of the shell and friction means.

10. In a friction shock absorbing mechanism, the combination with a spring cage having opposed side walls; of a friction shell telescoped within the cage; said shell and cage having relative movement in lengthwise direction; stop means on the cage limiting inward movement of the shell; friction means within the shell slidable lengthwise therein; springs within the cage yieldingly resisting inward movement of the shell and friction means; and means carried by said side walls of the cage having frictional engagement with the shell to retard outward movement of the same to snub the recoil action of the springs.

11. In a friction shock absorbing mechanism, the combination with a spring cage having opposed side walls; of a friction shell telescoped within the cage between said side walls, said shell and cage having relative movement in lengthwise direction; stop means on the cage limiting inward movement of the shell; friction means within the shell slidable lengthwise therein; springs within the cage yieldingly resisting inward movement of the shell and friction means; and a friction element mounted on each side wall of the cage having frictional engagement with the shell during outward movement thereof to snub the recoil of the springs.

ARNOLD E. DENTLER.
STACY B. HASELTINE.

Feb. 15, 1944. S. L. DIACK ET AL 2,341,700
ICE TRAY
Filed Jan. 25, 1941
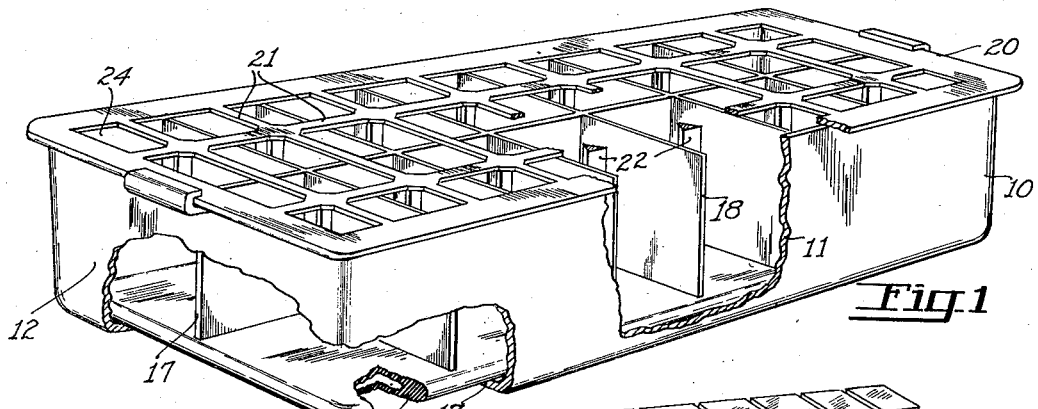
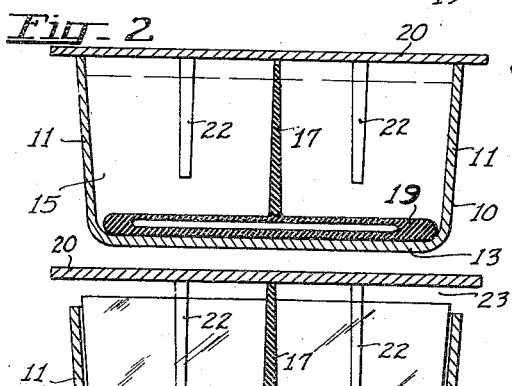
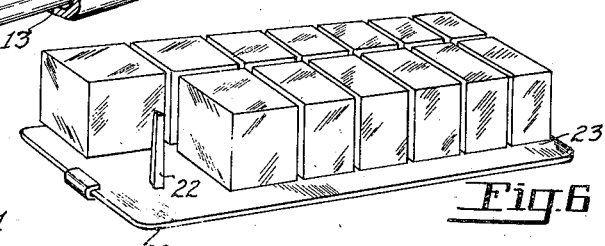
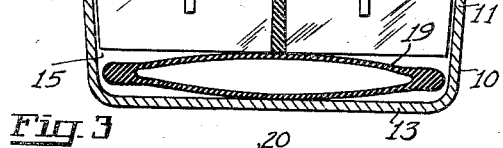
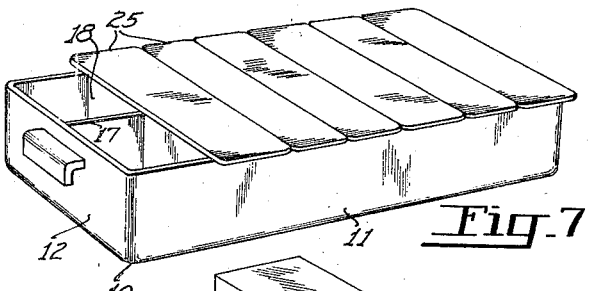
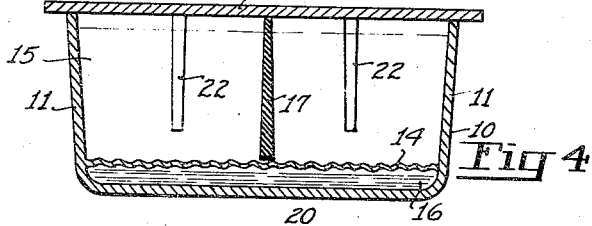
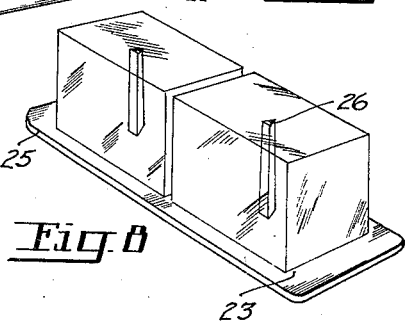
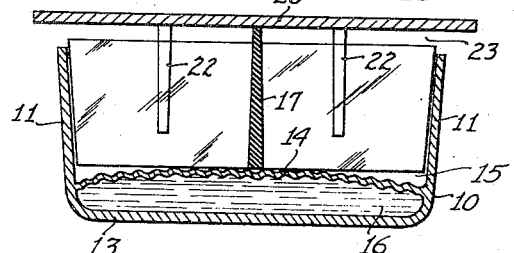
SAMUEL L. DIACK
ARCH W. DIACK
INVENTORS
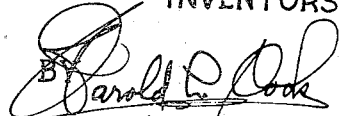
ATTORNEY